United States Patent [19]
Hodge

[11] Patent Number: 5,722,807
[45] Date of Patent: Mar. 3, 1998

[54] CLAMP LOAD INDICATOR

[75] Inventor: Malcolm H. Hodge, West Hartford, Conn.

[73] Assignee: Structural Integrity Monitoring, Willimantic, Conn.

[21] Appl. No.: 729,203

[22] Filed: Oct. 15, 1996

[51] Int. Cl.[6] .................................................. F16B 31/02
[52] U.S. Cl. ......................... 411/10; 411/14; 411/533
[58] Field of Search .......................... 411/1, 8–14, 531, 411/533

[56] References Cited

U.S. PATENT DOCUMENTS

| | | |
|---|---|---|
| 3,060,731 | 10/1962 | Adise ........................... 411/14 |
| 3,104,645 | 9/1963 | Harrison . |
| 3,169,440 | 2/1965 | Taylor ........................... 411/11 |
| 3,469,492 | 9/1969 | Dahl . |
| 4,047,463 | 9/1977 | Coldren . |
| 4,131,050 | 12/1978 | Holmes . |
| 4,164,164 | 8/1979 | Trungold . |
| 4,303,001 | 12/1981 | Trungold . |
| 4,483,648 | 11/1984 | Trungold . |
| 4,500,237 | 2/1985 | Pliml ........................... 411/11 |
| 4,773,272 | 9/1988 | Trungold . |
| 5,199,835 | 4/1993 | Turner . |
| 5,385,054 | 1/1995 | Kramer . |

FOREIGN PATENT DOCUMENTS

| | | | |
|---|---|---|---|
| 1553578 | 1/1969 | France ........................... 411/14 |
| 148956 | 11/1979 | Japan ........................... 411/11 |

*Primary Examiner*—Flemming Saether
*Attorney, Agent, or Firm*—Murtha, Cullina, Richter & Pinney

[57] ABSTRACT

A method and device for monitoring fastener loads as well as clamp loads imposed on base metal with a special washer usable with bolt heads, nuts, and other fastener elements which washer has at least one integral arm whose position is indicative of fastener load as determined by the phenomenon of dishing of the base metal and washer.

19 Claims, 4 Drawing Sheets

CLAMP LOAD INDICATOR

FIELD OF THE INVENTION

This invention generally relates to the monitoring of clamp loads exerted on base metal by fasteners and is more particularly directed to a mechanical device for cooperating with the fasteners to provide an indication of clamp load as well as clamp load changes. This invention also relates to the method and structure for sensing changes in the load on a fastener.

BACKGROUND OF THE INVENTION

Bolts, nuts and washers are a common part of any fastening system for securing two pieces of metal together, for securing a tension cable to an anchor or base metal or any of a wide variety of elements that must reliably clamp or secure two elements together under a predetermined load. Heretofore the monitoring of the clamp load force has been dependent upon sophisticated bolt load analyzers using personal computers or even personal workers who periodically "torque" a nut to ensure that it is exerting the proper clamping load. A modern jet airplane may have over 1 million fasteners of various types and an average car may be 3500 fasteners of various types whose clamp load must be properly set and often thereafter monitored to ensure the desired safety. So also with suspension bridges, the cable tension which produces a clamp load at the cable anchor-base metal-must be monitored to ensure proper nut loading. Even rivets establish clamp loads which must be set to the proper clamp load and thereafter inspected and subjected to clamp load monitoring techniques.

Methods for reliably monitoring of the integrity of the clamp force of a rivet or a threaded fastener have generally required high cost accessory equipment and high labor intensive techniques and methods.

OBJECTS OF THE INVENTION

It is a primary object of this invention to provide a sensing device for determining and monitoring clamp loads exerted on one or more base metal members whereby reduction in the clamp load is easily recognized by evaluation techniques ranging from simple visual inspection through complex optical and electronic devices that need not have physical contact with the sensor.

It is an additional object to provide a simple one piece sensing device for monitoring clamp load stresses in a fastener that is susceptible of easy installation with minimal intrusion into the conventional fastening system and which can be used with the bolt head, nut, or as desired.

It is a still further object of this invention to provide a sensor for monitoring clamp load stresses which sensor can be manufactured as part of a modified bolt head, nut or other fastening system and which can be re-used where appropriate and/or necessary.

It is another object of this invention to provide a low cost, easily installed device for monitoring clamp loads in situ, which device produces visible indication of a reduction in clamp loads and is suitable for use with conventional nut-bolt washer combinations, eye bolts and other conventional fasteners.

It is also an object of this invention to provide an improved method suitable for determining and, if desired, for thereafter monitoring clamp load stress that is non-intrusive and uncomplicated to use.

Included within the objects for monitoring clamp loads is the object of utilizing the device of this invention to assist in initial setting of fastener clamp loads.

The invention also contemplates utilization of improved stress monitoring methods which respond to normal fastener phenomena to provide facile indication of initial clamp load.

Other objects will be in part obvious and in part pointed out more in detail hereinafter.

SUMMARY OF THE INVENTION

This invention discloses a one piece device for monitoring pre-set clamp loads between a fastener and the base metal member(s) in situ by utilizing the phenomenon of "dishing" of a base metal or of a conventional washer between the bolt head, rivet head or nut of a fastener under a tensile clamp load that establishes a compression differential between the base metal material under the fastener head or nut and the base material under the outer diameter of a conventional washer that is larger in diameter than the fastener head or nut. Such compression differentials are not necessarily perceptible by the human eye yet provide a true indication of magnitude of clamp load as well as reduction in clamp forces of a fastener as it become "loose". This compression differential is recognized and clamp force reduction changes amplified by a simple washer-like device having, in the preferred embodiment a pair of upstanding arms integral with a washer-like base, which arms embrace the bolt head or nut and move relative to each other upon setting the clamp load as well as reduction in the desired clamp force, which movement is mechanically amplified but proportional to compression differential changes in the base metal member at least during setting of the clamp load.

An additional aspect of the structure of this invention utilizes the dishing phenomenon with the sensor washer with arms whereby compression dishing is a measure of clamp load on setting as indicated by the relative positioning of the ends of the arms on the washer-like device which arms embrace the fastener head or nut. The washer can be of a physical characteristic to follow compression dishing but not to carefully follow a reduction in dishing.

A better understanding of the objects, advantages, features, properties and relations of the invention will be obtained from the following detailed description and accompanying drawings which set forth certain illustrative embodiments and are indicative of the various ways in which the principles of the invention are employed.

Although this invention has been illustrated and described with respect to exemplary embodiments thereof, it should be understood by those skilled in the art that various changes, omissions and additions may be made without departing from the spirit and scope of the invention.

Although this invention has been illustrated and described with respect to exemplary embodiments thereof, it should be understood by those skilled in the art that various changes, omissions and additions may be made without departing from the spirit and scope of the invention.

DETAILED DESCRIPTION OF THE INVENTION

Before commencing a detailed description of the invention, it is believed important to discuss the phenomenon generally referred to as "dishing" or the dishing effect experienced by a washer of greater diameter than a bolt head having a threaded end engaging a nut to apply a clamping force to base metal members such as two metal members to be clamped in overlapping engagement. The theoretical explanation for the washer dishing effect is not essential to the invention: it occurs! Nonetheless, it is believed that a plausible explanation of the dishing effect will enhance understanding of the scope and breadth of this invention.

Figure 1A:
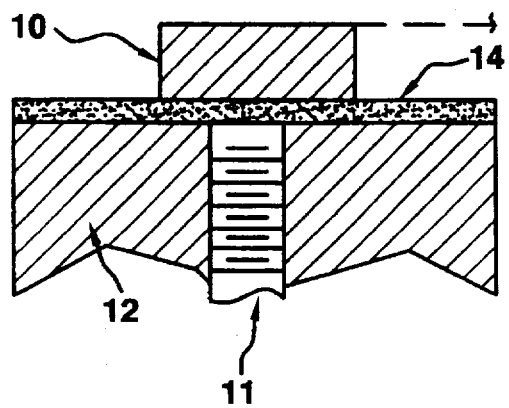
FIG. 1a is an idealized schematic showing a conventional headed fastener, washer and base metal.

Referring first to the schematic of FIG. 1a there is shown a conventional headed fastener 10 including threaded shank 11 extending into base metal 12 which base metal can conveniently be two metal pieces to be clamped together by engagement of shank 11 with a suitable nut, not shown. Washer 14 is of a diameter much greater than bolt head 10. FIG. 1a is exaggerated as is FIG. 1b which represents the elements of FIG. 1a after the bolt-nut combination have been tightened to compress the base metal 12 to apply tensile force to bolt 10 and its shank (not shown) which force extends in the direction of the arrow 16.

Figure 1B:
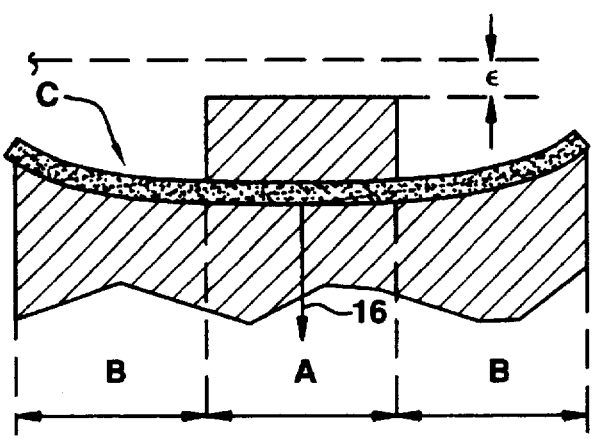
FIG. 1b is an idealized schematic of the fastener combination of FIG. 1a after application of bolt tension to effect a clamp load.
Figure 2:
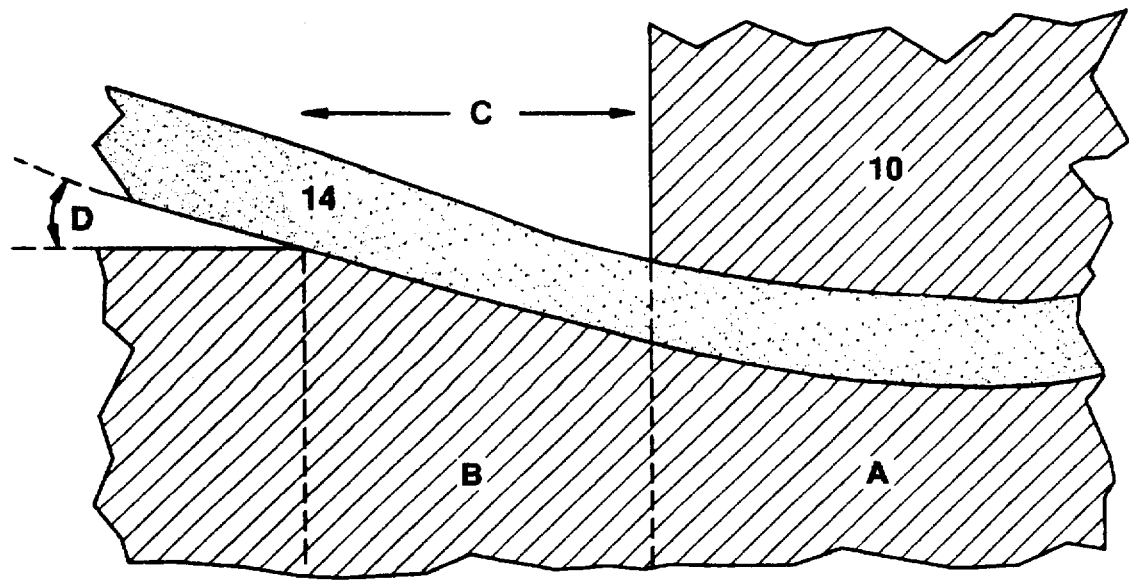
FIG. 2 is an enlarged view of the idealized showing of a portion of FIG. 1b.

As previously noted, FIGS. 1a and 1b illustrate an exaggerated representation of the bolt-washer-base metal combination before and after the bolt has been tightened to produce a strain which has been exaggerated by the dotted lines 17 and 18 and for purposes of reference that strain is identified by the Greek letter $\epsilon$. As noted in FIG. 1b, the strain 16 ($\epsilon$) has placed the base metal under a compressive load which has been shown (schematically) to have been accommodated through compressive distortion of the base metal while the material under the bolt head remains substantially unaffected. Similarly the bolt head engages washer 14 and that portion under the bolt head identified by the letter A in FIG. 2 is under pure compression but, where the washer 14 extends beyond the bolt head it extends into a transitional zone which is identified by the letter B such that the washer 14 spans some or all the transition zone identified by the letter C between the fully strained Region A and the ever progressively less strained Region B. Because "strain" is effectively defined as a change in dimension, that change of dimension being identified in FIG. 1b by the Greek letter $\epsilon$. Clearly the bolt head may be a rivet head, or the like.

It is inevitable that the washer will be forced to follow the curve of the base metal resulting from the strain distorted clamped surface of the base metal; whether or not it actually conforms exactly to the surface by bending into a shell curve will depend upon the relative strength in rigidity of washer 14. If washer 14 is very rigid and has a high modulus of rigidity but is, at the same time "weak", then the washer will not conform to the base metal but rather will fracture; such action is clearly not useful in fulfilling the objects of this invention. The clamp load phenomenon of this invention depends upon Region B, the traditional region extending under the washer from the bolt head to be both strong (so as not to fracture) and somewhat flexible, at least flexible enough to follow part of the clamped surface distortion profile caused by the strain.

Based upon the foregoing analysis, the rigid and massive bolt head suffers little distortion and exerts all of its clamping force over the head area on the base metal and washer. The relatively rigid but extremely thin and quite expansive washer absorbs very little compressive strain in the directly compressive system of Region A but in Region B, where the base metal's strain transition takes place, the substantially cantilevered washer has little choice but to conform to the clamped surface strain recovery profile and hence it "dishes". The relatively expansive and lower modulus material of the clamped material experiences the bulk of the strain effected by the clamping force. The precise amount of washer dishing could be calculated for a combination of known materials with specific geometries and precise dimensions and hence the magnitude of angle D of FIG. 2.

To summarize, the washer 14 and its extremities must have a dimension greater than that of bolt head (or rivet) 10 (or of a nut used with threaded shank 11 ) and the clamped surface for base metal must extend beyond the bolt head in at least one direction. To say this another way, there must be a portion of the washer 14 occupying Region B otherwise there will not be a portion of the washer on which to exert the unbalanced moment caused by dishing and hence no indication.

Having now generally considered the phenomenon of dishing, it is appropriate to proceed to a description of the several embodiments of this invention.

Figure 3:
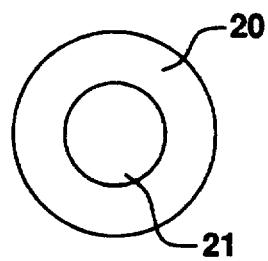
FIG. 3 is a plan view of a conventional washer.
Figure 4:
FIG. 4 is a cross-section view of the washer of FIG. 3.

Exploitation of the dishing effect is more clearly understood from FIGS. 3, 4, 5, 6, 6a, 7 and 8. In FIGS. 3 and 4 there is shown for reference purposes a common conventional washer 20 having a generally annular plan view with a central aperture 21 and a side view showing the conventional flat configuration 22.

Figure 5:
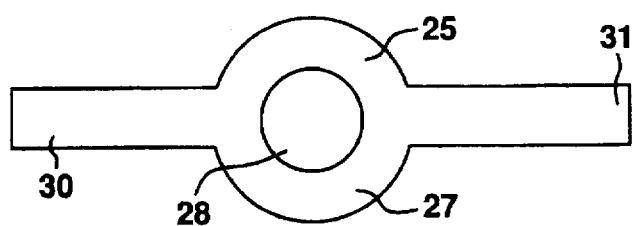
FIG. 5 is a plan view of a flat blank of a preferred embodiment of the sensor of this invention.

By comparison the clamp load monitoring device generally designated 25 of a preferred embodiment of this invention is seen in FIG. 5 as generally comprising a flat washer portion 27 having a central aperture 28 and a pair of oppositely extending diametrically opposed arms 30 and 31 and, as originally formed as by blanking or stamping, is a planar structure having, in the preferred form, arms 30 and 31 integral with and substantially the same thickness as washer 27. The length of each arm can be varied to cooperate with a specific indicator/display system to be subsequently described. In accordance with the scope of this invention, a single radially outwardly extending arm can be utilized with this invention in accordance with the indicator system selected.

Figure 6:
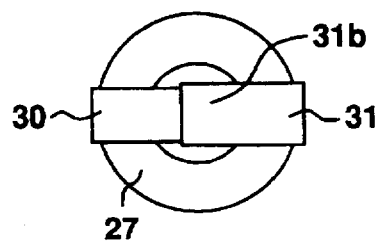
FIG. 6 is a plan view of the sensor of FIG. 5 with the arms folded.
Figure 6A:
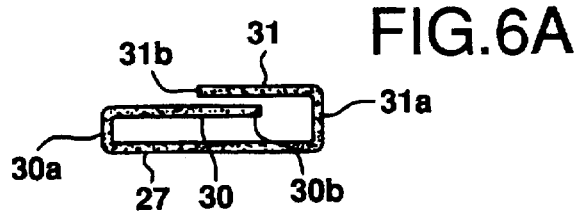
FIG. 6a is a schematic cross-section view of the sensor of FIG. 6.

FIGS. 6 and 6a disclose that each arm 30, 31 is provided, as by bending, with an upwardly extending generally perpendicular section 30a and 31a which are thereafter bent to provide over-lapping arm ends 30b and 31b. The tools and techniques for such bending can be conventional or as set forth in companion applications.

Figure 7:
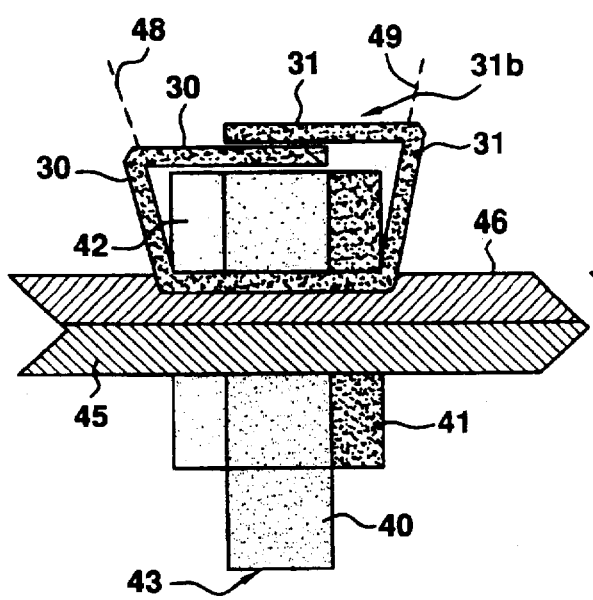
FIG. 7 is a side view partially in section showing the sensor of this invention installed prior to exerting a clamp load by the bolt.
Figure 8:
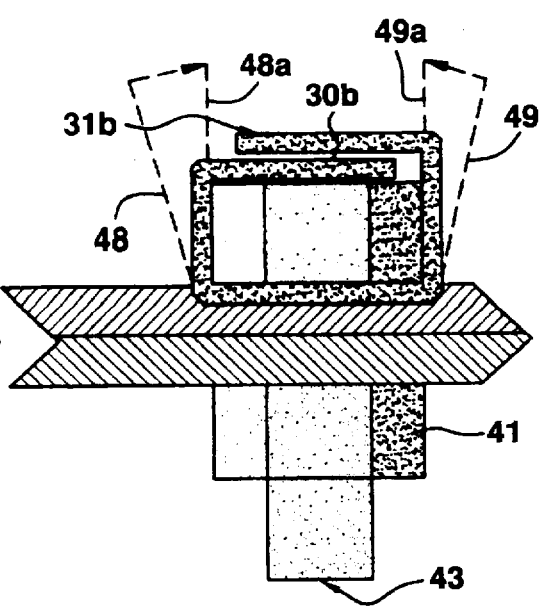
FIG. 8 is a side view of the combination of FIG. 7 after the fastener has been tightened to exert a clamp load.

The reason for configuring washer 25 in the form shown is best understood from consideration of FIGS. 7 and 8. In FIG. 7, a bolt 40 having a head 42 is provided with the usual hexagonal configuration and a threaded shank 43 extending thorough suitable apertures (not shown) in base metal members 45 and 46 into engagement with nut 41. Arms 30 and 31 are shown in the upwardly bent position of dotted lines 48 and 49. The arm ends 30 and 31 are shown as generally "embracing" bolt head 42 with ends 30 and 31b overlapped as at 48. The position of the clamp load monitoring device of FIG. 7 of this invention is shown in the relaxed state with the bolt and nut "finger tight" and not exerting any significant clamp load on the members 45 and 46.

In FIG. 7 the clamp load sensor together with the bolt and nut is shown in the configuration where the desired clamp load has been applied to the fastener and base metal members. The dotted lines 48 and 49 showing arm position are shown as having moved toward bolt head 48 to the positions 48a and 49a and to closely embrace and engage bolt head 42. By way of further explanation the desired clamp load can be obtained with a suitable torque wrench or, if desired, the nut can be rotated by any suitable tool until the desired overlap of arms 30b and 31b is obtained.

If the clamping force applied between bolt head 42 and nut 41 reduces through the usual causes of vibration, changing loads, etc. that reduction on clamp force which holds arms 30 and 31 in the position shown in FIG. 8 it is reduced, the dishing of the base metal 45 and 46 is reduced, the dishing of washer portion 27 (see FIG. 6a) is reduced and arms 30 and 31 move toward the dotted line position of FIG. 7 thereby to provide a visual indication of the reduction in the desired clamping force and load on the fastener.

Depending upon the selection of material for washer 27, reduction in clamp load may not produce exaggerated arm movement, particularly if washer 27 is formed from a malleable material. Under such circumstances, the sensor merely functions as a clamp load setting device without extensive arm movement upon reduction of clamp load.

As hereinafter pointed out in greater detail, the relative movement of the ends 31b and 30b of arms 30 and 31 can be sensed in a variety of ways some of which are hereinafter described in this application.

Figure 9:
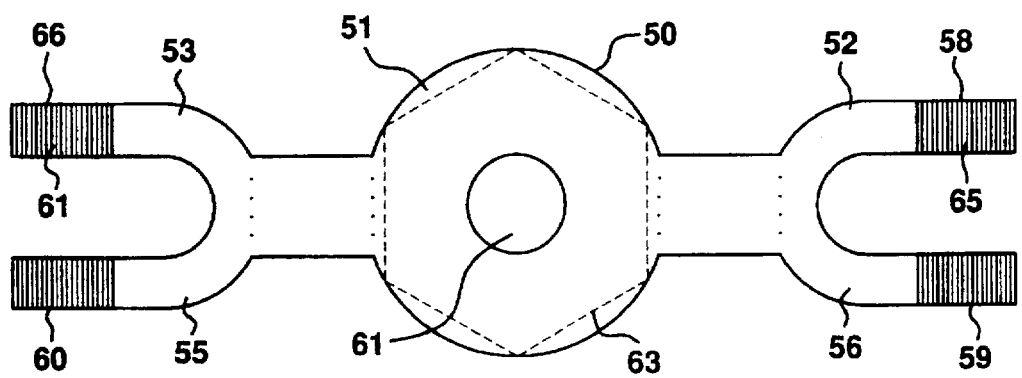
FIG. 9 is a plan view of a further embodiment of the invention showing the nut in dotted lines.

Turning next to the embodiment of the invention shown in FIG. 9, it is seen that the load monitoring device generally designated 50 has a washer portion 51 and a pair of oppositely extending arms generally designated 52 and 53. This particular embodiment of the invention provides generally u-shaped ends 55 and 56 so as to provide each arm with spaced end portions 58, 59, 60 and 61 which are spaced apart so as to accept a fastener shank extending through aperture 61. The nut 63 is shown in dotted lines in FIG. 9 and ends 58, 59, 60 and 61 of arms 52 and 53 are shown with grid lines 65 and 66, which grid lines are used in conjunction with a suitable sensor such as state of the art fiber optic sensor system which will sense and if necessary measure relative movement between arms 52 and 53 to indicate a change in clamp load.

Figure 10:
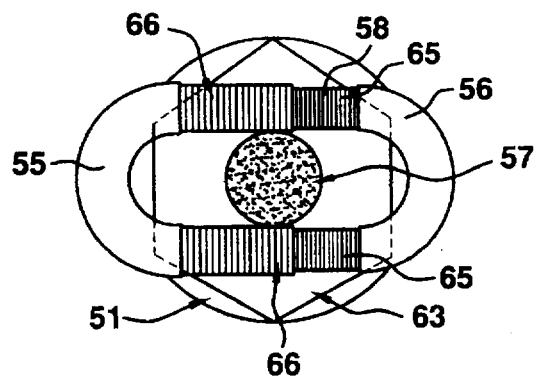
FIG. 10 is an end view of the invention assembled on a fastener.

Turning next to FIG. 10, it is seen that, much in the style of FIGS. 5, 7, and 8, a clamp load monitoring device suitable for use on the nut end of a fastener has been assembled with bolt 57 and nut 63 to exert a clamp load on any suitable base member (not shown). Arms 52 and 53 have been bent in a direction perpendicular to washer 51 so that end 56 and end 55 can be further bent over to embrace the nut 63 in much the same manner as is shown with the bolt head in FIGS. 7 and 8 with the arm ends accommodating bolt 57 extending through the overlapped u-shaped end portions.

As with the embodiment described in FIGS. 7 and 8, exertion of a clamp force on the base material by nut 63 engaged with fastener 57 thereby to dish the base metal not shown and the washer 51. With the arms 52 and 53 overlapped in FIG. 10, any relaxing of the clamp load will tend to reduce the dishing thereby to cause the arms 52, 53 to move outwardly toward the position shown in FIG. 7. The optical grid work provides a source of precise measurement of any movement of the optical grids 65 and 66 and thereby providing, in effect, an early warning of the diminishment of the clamp load which may lead to failure of the fastener, loosening the base metal, etc. As previously explained the clamp load can be obtained by any suitable tool and, if desired, the amount of overlapping of arms 52 and 53 can indicate clamp load.

Figure 11:
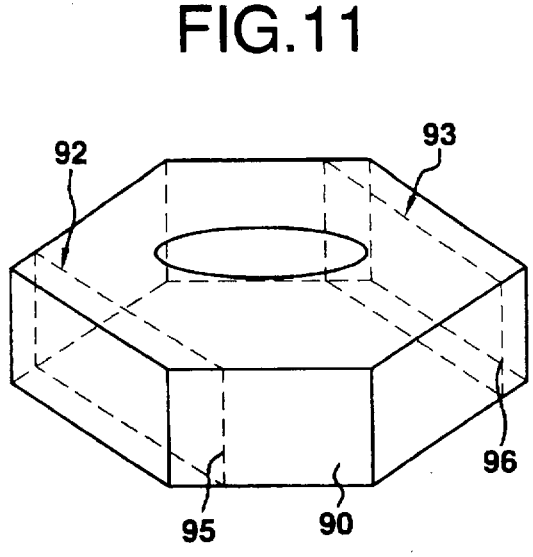
FIG. 11 is a perspective view of a specially formed nut to be used with another embodiment of the invention.
Figure 12:
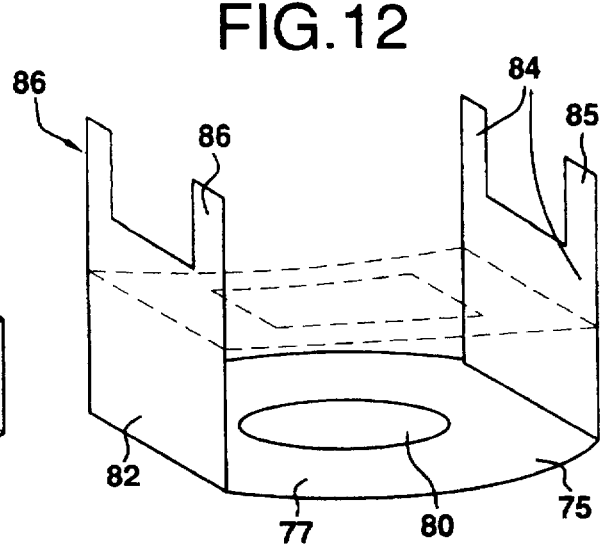
FIG. 12 is a perspective view, partially in dotted lines of the sensor to be used with the nut of FIG. 11.

An additional embodiment of the invention is shown in FIGS. 11 and 12 which embodiment is intended to provide a sensor generally designated 75 having a washer like central portion 77 and a central bolt receiving aperture 80 with arms 82 and 84 extending in a direction generally perpendicular to washer portion 77. As in embodiment of FIGS. 9 and 10, arms 82 and 84 have spaced ends 85 and 86 which define between the extremities a passageway to receive a fastener extending through aperture 80. In this embodiment however the nut 90 of FIG. 11 while appearing to be a conventional hexagonal nut, actually as two faces 92 and 93 which have been shaved or reduced in size to the dotted lines 95 and 96. Hence when nut 90 is positioned between arms 84 and 82 to exert a clamp load between washer portion 77 and the base metal, the reduced width portions of nut 90 are such as to accommodate a standard hexagonal wrench with the arms 82 and 84 being received within the standard nut profile. In FIG. 12, the dotted lines show arms 82 and 84 bent downwardly to permit arms 85 and 86 to overlap, abut, or such other positioning as may be desired. As the base metal (not shown) and washer portion 77 "dish" under a clamp load as described in connection with the embodiments of FIGS. 7, 8, 9 and 10, relative movement between ends 85 and 86 can take place; similarly if the clamp load is reduced, and the washer is not made of a malleable material relative movement between the arms ends 85 and 86; such change of position and movement will occur to present an early warning of such clamp load reduction and possible loosening of the fastener.

Figure 13:
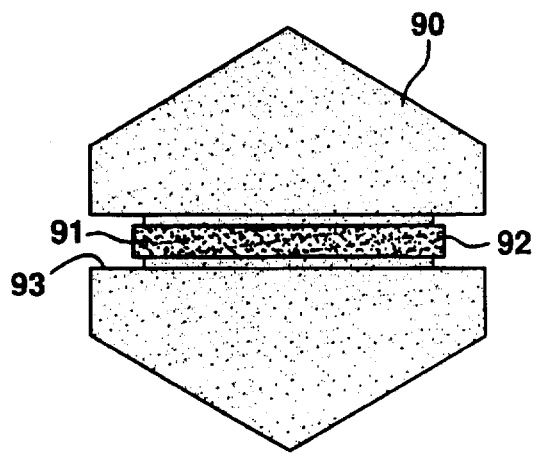
FIG. 13 is a top plan view showing a bolt head with a sensor whose arms are folded into slots in the head.
Figure 14:
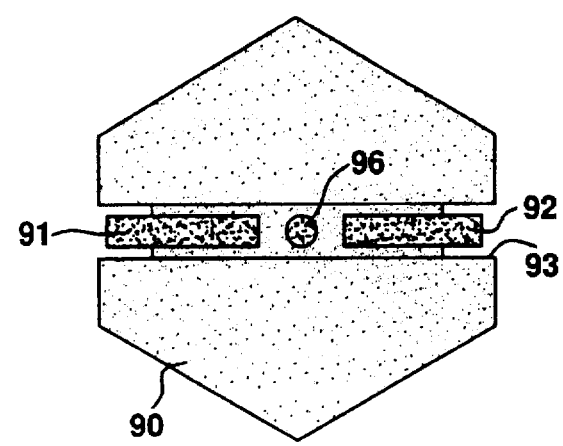
FIG. 14 is another plan view of the embodiment of the invention of FIG. 13 with fastener tension reduced to reveal a "tell tale" indicator.

There is shown in FIGS. 13 and 14 and embodiment of the invention which tends to combine many of the foregoing features of the invention wherein a bolt head 90 is provided with a groove to accept the overlapping arms of the embodiment FIG. 7 or as shown in FIG. 13, the abutting arms 91 and 92. In the disclosed embodiment, the groove 93 extends through two faces of the bolt head and across its top so as to place the arms 91 and 92 within the profile of the bolt head. The remainder of the sensor is substantially the same as that shown in the prior embodiments wherein there is provided a washer with upstanding arms (not shown) to provide and support the ends 92 and 93 which are folded to embrace the bolt head. The position of ends 92 and 93 in FIG. 13 is shown for purposes of explanation to be the desired full clamp load. As the clamp load is reduced, the amount of dishing is reduced and the arms tend to separate to the position shown in FIG. 7 thereby exposing a visible tell tale 96 to permit simple visual inspection to inform the inspector that the clamp load has been reduced and that a lessening of the clamp force has taken place. When applying clamp load, the disappearance of tell-tale 96 can signify the proper load.

Figure 15:
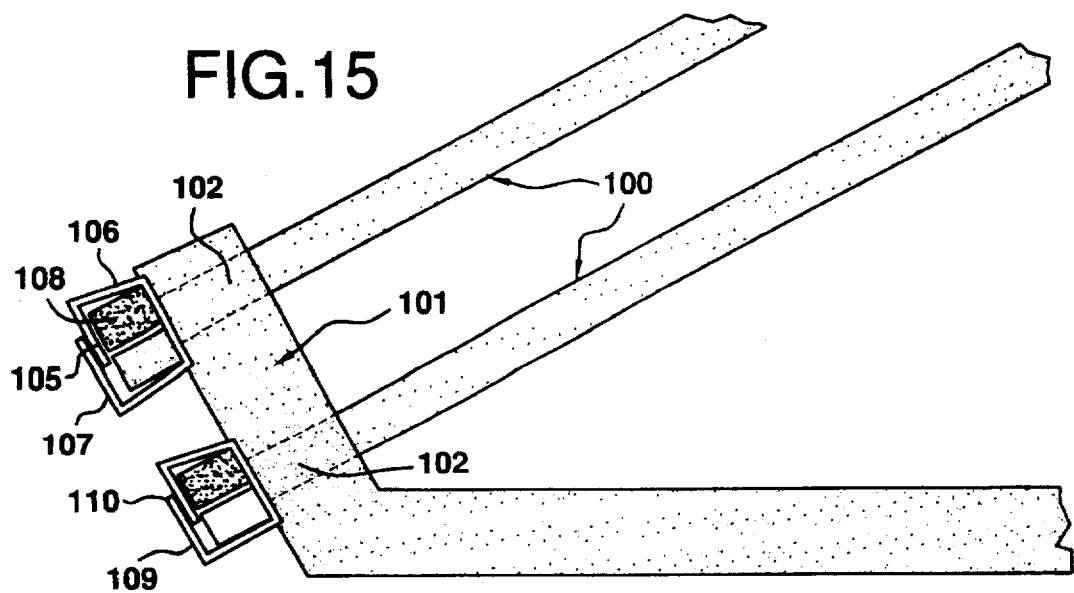
FIG. 15 is a schematic view of one embodiment of the invention used with suspension cables.

To illustrate the wide range of uses of this invention, FIG. 15 shows cables 100, such as cables used in suspension bridges, which are secured to base metal 101 by extending there through to terminate in threaded ends 102 (shown in dotted lines); base metal 101 can be any suitable anchor. The cables 100 are placed under the desired tension thereby to exert a load on anchor 101 by torquing of nuts secured to the threaded ends. The clamp load (or cable tension) is monitored by sensors 105, sensors which respond to the dishing of anchor 101 or base metal 101 in the same manner as described for FIGS. 7 and 8 so that the movement of arms 107, 108, 109 and 110 serve to monitor the (clamp) load exerted on base metal anchor 101. As is commonly known, cables 100 can be terminated in eye bolts which extend through the anchor to cooperate with the nuts.

Hence there is provided a wide variety of embodiments of the present invention which utilize the phenomenon of dishing of a base metal to provide a sensor for monitoring clamp loads on base metal, which clamp loads can be monitored by placing a sensor of this invention under the bolt head, as in FIGS. 7 and 8, or under the nut as in FIGS. 10, 11, and 15 the structures of FIGS. 10 and 11 being modified to accommodate the end of the bolt as it extends through the nut as disclosed in FIGS. 10 and 12 for example. Not shown in the drawings is use with a rivet head rather than a bolt head.

The wide range of indicators useful with the present invention are seen in FIGS. 9 and 10 utilizing an optical grid. FIGS. 13 and 14 using abutting arm ends in the groove formed in the bolt such that movement upon lessening of the clamp load exposes a visual tell tale, or other indicators suitable to the use intended.

The sensor of this invention is easily fabricated from conventional materials, is low in cost and useful under a wide variety of clamp load circumstances, tension loads as with cables and other environments. The sensor can be used, for example, with a standard washer between washer base 51 of FIG. 9 and the base metal thereby to substantially eliminate any twisting forces to be exerted on the sensor upon tightening of the fastener. A similar situation can be met with the embodiments of FIGS. 10 and 12 with a conventional washer being placed between the washer portion of the sensor and the nut, again to reduce twisting forces and torque movements upon tightening of the fastener.

As is apparent to those skilled in the art, the indicator/monitor of this invention can be used with suitable wrenches or other tools to ensure proper fastener tightening upon installation. Any suitable wrench can be used to tighten a nut until, for example, the tell tale 96 of FIG. 14 is obscured. While torque wrenching is common, the monitor/sensor of this invention can be used with any threaded fastener to exert the desired clamp load, which load can be ascertained by the sensing device of this invention by determining the amount of arm overlap required to produce the desired clamp load.

The low cost of the instant invention permits extensive use of this sensor particularly in environments such as aircraft and automobiles wherein the numbers of threaded fasteners which must be inspected are very large in number. Moreover reliance solely upon torque wrenches to establish the proper clamp load can be obviated by the sensor/monitor of this invention.

I claim:

1. A clamp load magnitude sensing device suitable for use in cooperation with a fastener comprising:
    a flat washer having uniform thickness and an annular aperture for receiving a fastener, said washer having at least one marginal washer edge;
    at least one arm extending from said one marginal washer edge;
    said arm being formed integrally with said washer and extending generally perpendicular to said washer;
    said arm being moveable in response to loads applied generally perpendicular to a surface of said washer when said washer is installed with a suitable fastener providing a tension load;
    said washer being formed from a material that will follow deflection of a base metal with which it is used.

2. The sensor of claim 1 wherein a second arm is formed integrally with said washer and extends generally perpendicular thereto, said second arm being located at the washer marginal edge generally opposite to said one arm.

3. The sensor of claim 2 wherein said one arm and said second arm each terminate in and end which can be over lapped with the other end on the bolt head or nut whereby movement of said one arm and said second arm effects relative movement of the overlapped ends of the arms.

4. The sensor of claim 3 wherein the overlapped ends are generally u-shaped to define a central fastener receiving aperture.

5. The sensor of claim 2 wherein the washer has an outer marginal edge, said first arm and second arm extend from said outer marginal edge each said first arm and said second arm terminating in end portions which form overlapped end portions upon deflection of said first and said second arms from the outer marginal edge.

6. The sensor of claim 2 wherein the washer has an outer marginal edge said first and second arm terminate in abutting end portions upon deflection of said first arm and said second arm from the outer marginal edge to embrace a bolt head.

7. The sensor of claim 6 wherein a visible tell tale is disposed beneath the abutting first arm and second arm, said tell tale being exposed upon movement of the first arm and second arm in opposite directions upon reduction of clamp load on the fastener.

8. A clamp load magnitude sensing device suitable for use in cooperation with a fastener comprising:
    a flat washer having uniform thickness and an annular aperture for receiving a fastener, said washer having at least one marginal washer edge;
    at least one arm extending from said one marginal washer edge;
    said arm being formed integrally with said washer and extending generally perpendicular to said washer;
    said arm being moveable in response to loads applied generally perpendicular to a surface of said washer when said washer is installed with a suitable fastener providing a tension load;
    said washer being formed from a suitable stress resistant material for use with clamp loads within the limits of resiliency of the material from which the washer is made.

9. The sensor of claim 8 wherein a second arm is formed integrally with said washer and extends generally perpendicular thereto, said second arm being located at the washer marginal edge generally opposite to said one arm.

10. A fastening system for monitoring in situ the magnitude of tension stress in fasteners comprising:
- a flat washer of uniform thickness having an apertured configuration defining an upper and lower surface with an inner marginal aperture edge and an outer marginal washer edge;
- fastening means extending through the washer aperture and having a bolt head or nut engaging the upper surface of said washer, said bolt head or nut being of lesser effective diameter than the effective diameter of said washer outer marginal edge;
- at least one arm affixed to and extending away from the outer marginal edge;
- said arm being formed integrally with said washer and extending generally perpendicular to said washer in the direction of said bolt head or nut;
- said arm being moveable in response to compressive stress applied to said washer by said fastening means;
- said washer being formed from a material that will follow deflection of a base metal with which it is used.

11. The fastening system of claim 10 wherein said washer is formed from a suitable stress resistant material for use with clamp loads within the limits of resiliency of the material from which the washer is made.

12. A fastener system comprising a bolt having a head and a threaded end;
- a nut for engaging the bolt threaded end;
- a base member through which the bolt extends to engage the nut;
- washer means disposed between the nut and the base member; and
- a load sensing device disposed between the bolt head and the base metal sensing device said sensing device comprising:
- a flat washer having uniform thickness and an annular configuration for receiving the bolt, said washer having at least one marginal washer edge;
- at least one arm extending from at said one marginal washer edge;
- said arm being formed integrally with said washer and extending generally perpendicular to said washer;
- said arm being moveable in response to loads applied generally perpendicular to a surface of said washer when said washer is installed with a suitable fastener providing a load;
- said washer being formed from a suitable stress resistant material for use with loads within the limits of resiliency of the material from which the washer is made.

13. The fastener system of claim 12 wherein said load sensing device has a second arm formed integrally with said washer and extends generally perpendicular thereto, said second arm being located at the washer outer marginal edge generally opposite to said one arm said first arm and second arm each terminate in spaced end portions which form overlapped end portions upon deflection of said first and said second arm from the outer marginal edge, said end portions defining a passageway for the bolt when the first and second arms are bent to an overlapped position.

14. The fastener system of claim 12 wherein a groove is provided in said bolt head to receive said one arm.

15. The fastening system of claim 12 wherein a second arm is formed integrally with said washer generally opposite said one arm.

16. The fastening system of claim 15 wherein said one arm and said second arm are bent to embrace said bolt head and said one arm and said second arm are moveable in response to changes in the clamp load.

17. The fastening system of claim 16 wherein said bolt head is grooved to receive said one arm and said second arm.

18. The method for establishing and/or monitoring clamp loads in a headed fastener such as a bolt releasably joining base metal elements comprising
- placing a flat sensor having a suitable aperture for the bolt on the bolt adjacent the head portion
- providing at least one arm extending from said sensor
- deflecting the arm into a position with an end on top of the bolt head
- stressing the fastener to apply a tension load of a desired magnitude to the fastener to deflect the base metal so as to dish said base metal and to dish the sensor thereby to deflect said arm toward said bolt head.

19. The method of claim 18 including the steps of providing two opposed arms on the sensor, and
- deflecting the two arms into a position engaging the top of the bolt head.

* * * * *